No. 786,427. PATENTED APR. 4, 1905.
C. R. DAVIS.
DISK PLOW.
APPLICATION FILED MAY 27, 1903.
6 SHEETS—SHEET 2.
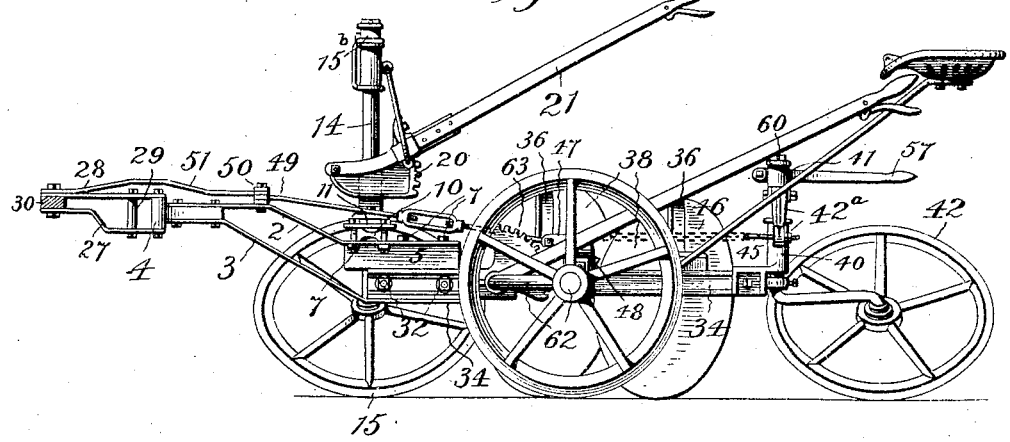
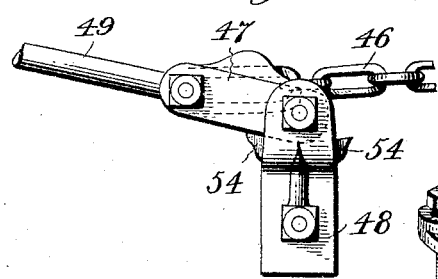
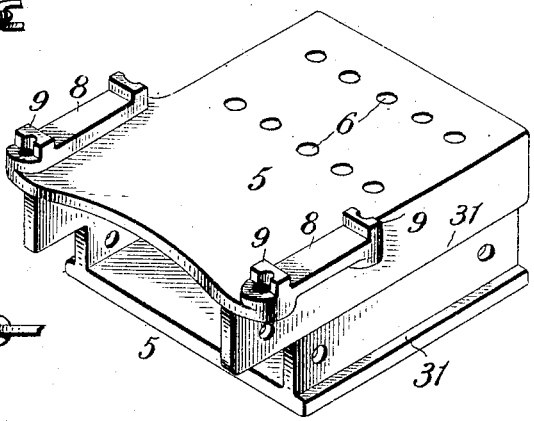
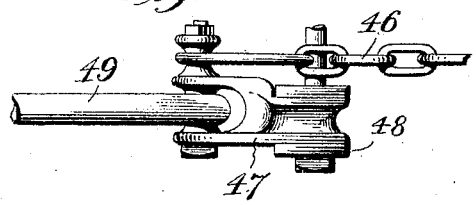
WITNESSES
Jas. E. Hutchinson
G. F. Downing
INVENTOR
C. R. Davis
By H. A. Seymour
Attorney No. 786,427. PATENTED APR. 4, 1905.
C. R. DAVIS.
DISK PLOW.
APPLICATION FILED MAY 27, 1903.
6 SHEETS—SHEET 3.
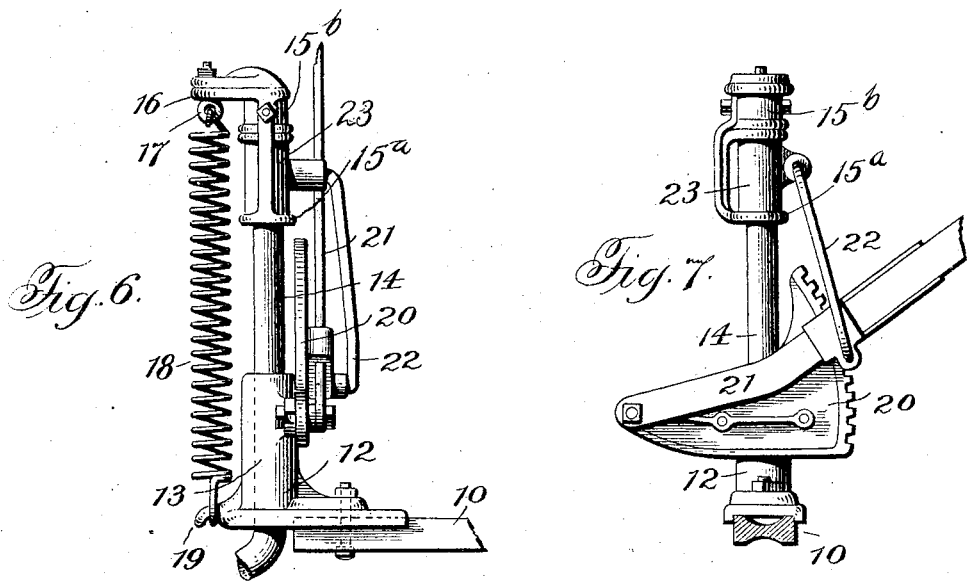
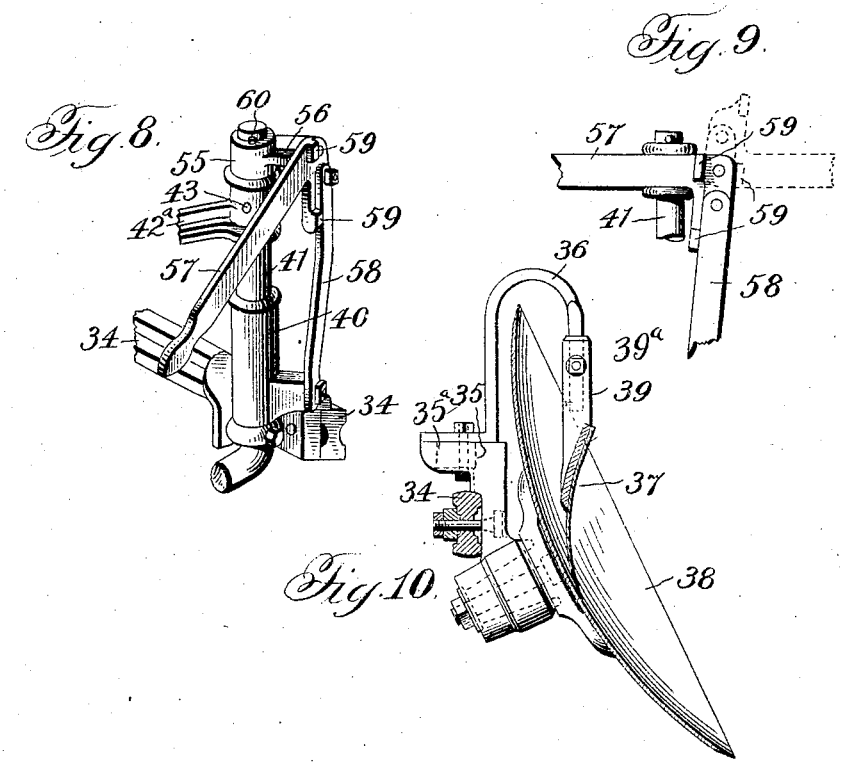
WITNESSES
Jas. E. Hutchinson
G. F. Downing
INVENTOR
C. R. Davis
By H. A. Seymour
Attorney No. 786,427. PATENTED APR. 4, 1905.
C. R. DAVIS.
DISK PLOW.
APPLICATION FILED MAY 27, 1903.
6 SHEETS—SHEET 4.
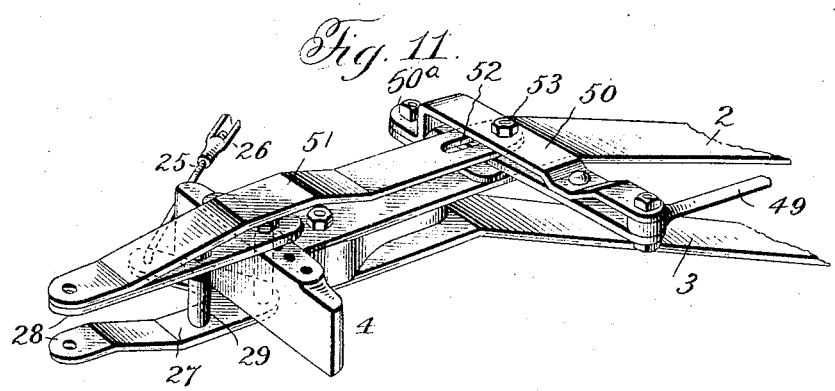
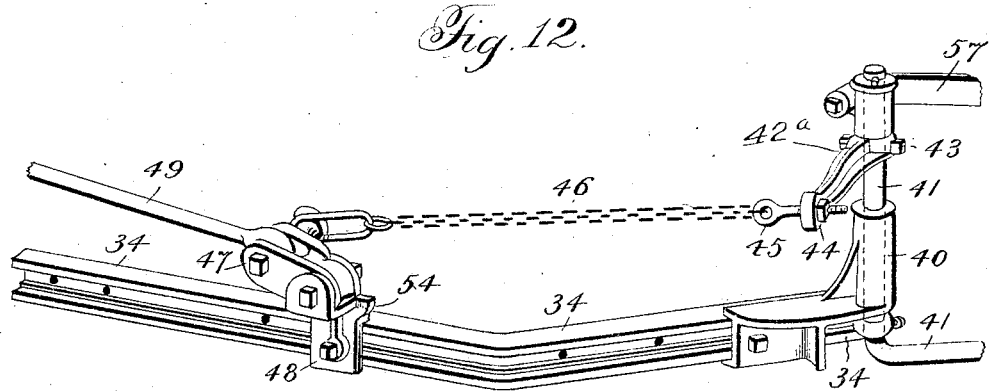

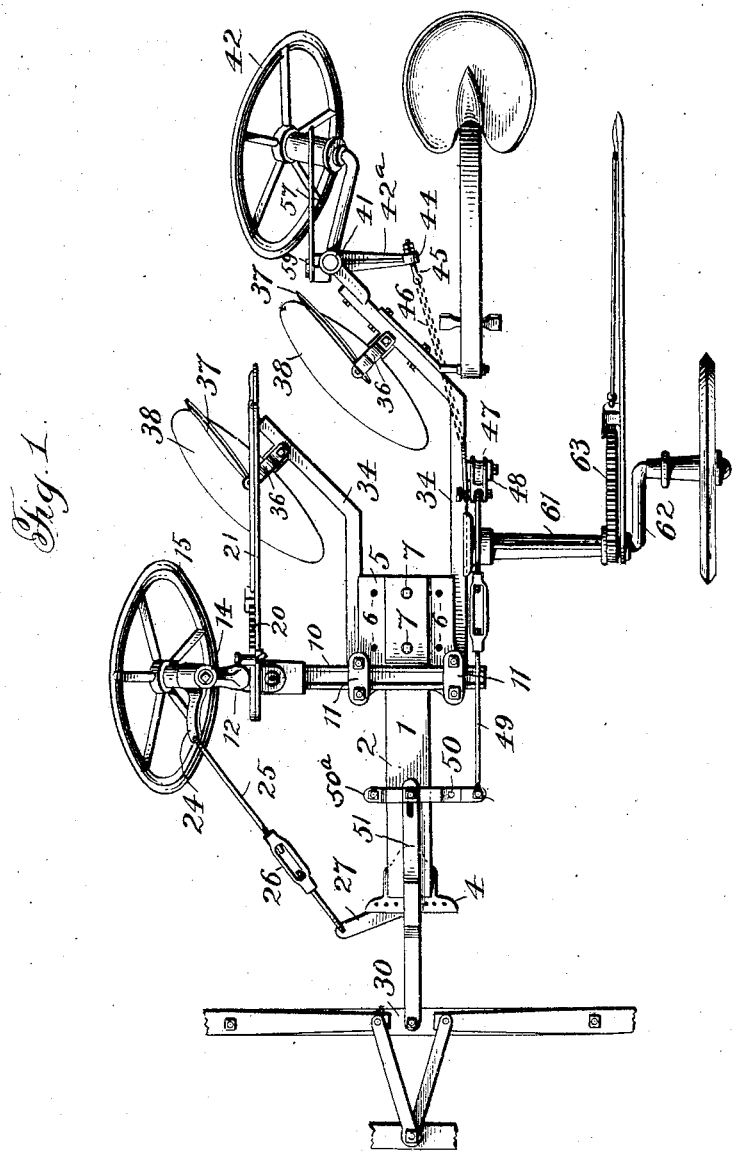

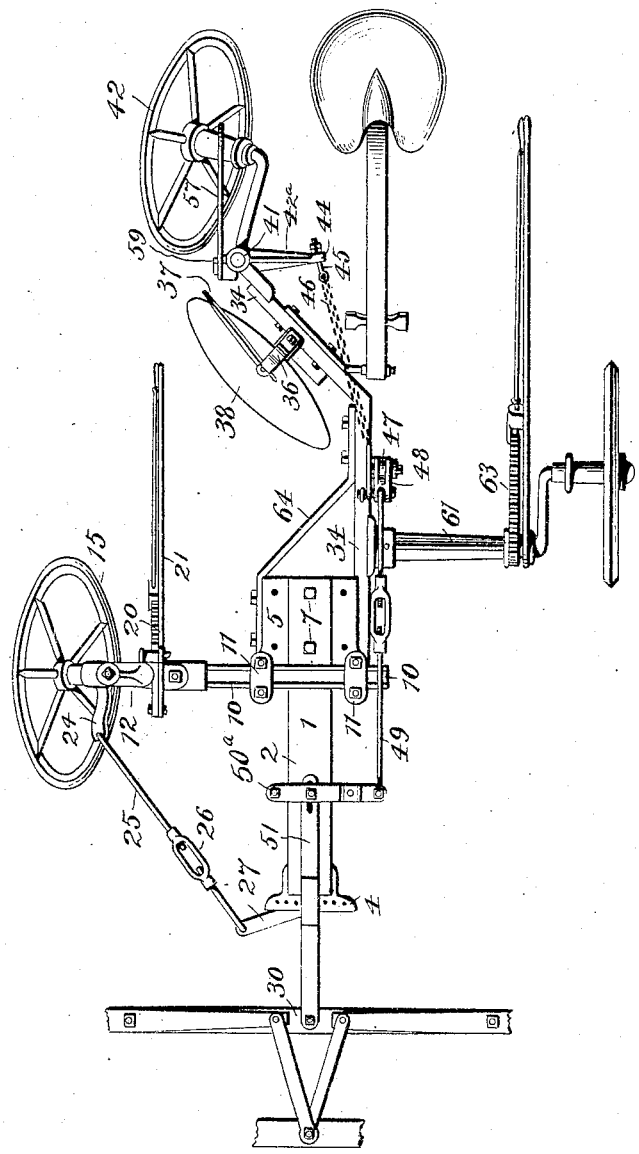

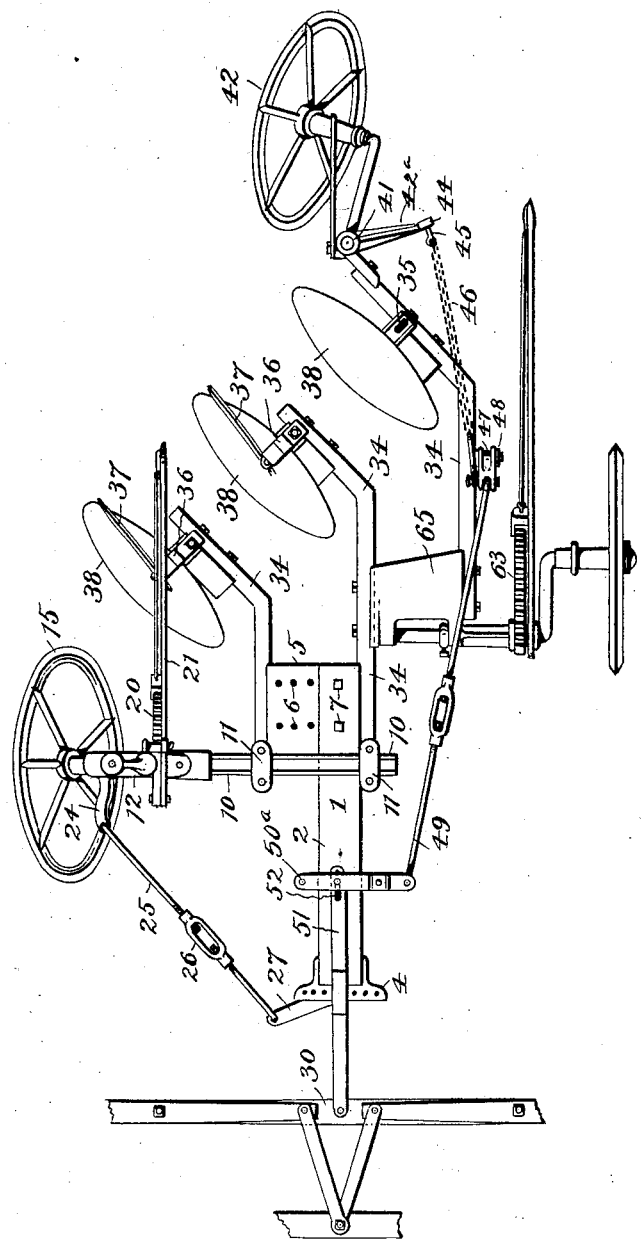

No. 786,427.

Patented April 4, 1905.

UNITED STATES PATENT OFFICE.

CALVIN R. DAVIS, OF SOUTH BEND, INDIANA, ASSIGNOR TO THE OLIVER CHILLED PLOW WORKS, OF SOUTH BEND, INDIANA.

DISK PLOW.

SPECIFICATION forming part of Letters Patent No. 786,427, dated April 4, 1905.

Application filed May 27, 1903. Serial No. 159,036.

*To all whom it may concern:*

Be it known that I, CALVIN R. DAVIS, of South Bend, in the county of St. Joseph and State of Indiana, have invented certain new and useful Improvements in Disk Plows; and I do hereby declare the following to be a full, clear, and exact description of the invention, such as will enable others skilled in the art to which it appertains to make and use the same.

My invention relates to an improvement in disk plows constructed with one or more plowing-disks mounted on a frame diagonally to the line of draft and suitably supported by landside furrow and caster wheels, the object of the invention being to provide a structure that will be simple and of ample strength to withstand the severe usage to which implements of this class are subjected and one in which the parts may be easily and quickly assembled and adjusted.

A further object is to provide means for holding the caster-wheel in line while plowing independently of the furrow-wheel, so that the wabbling movements of the latter will not necessarily be transmitted to the caster-wheel, as they necessarily would be if the two were directly connected.

A further object is to provide a caster-wheel connected by flexible devices with the draft-clevis, so that the caster-wheel will always be free to make a left-hand turn, but will be positively restrained against a movement or caster in the opposite direction, except when released by the turning of the draft-clevis.

With these and other objects in view my invention consists in the parts and combinations of parts and in the details of construction, as will be more fully explained, and pointed out in the claims.

In the accompanying drawings, Figure 1 is a plan view of my improvement. Fig. 2 is a side view of same. Fig. 3 is a view in perspective of the coupling-block. Figs. 4, 5, 6, 7, 8, 9, and 10 are detached views of parts. Fig. 11 is a perspective view of the draft-clevis and its connected parts. Fig. 12 is a perspective view of the rear beam, caster-wheel post, and the connection between the draft-clevis and caster-wheel post; and Figs. 13 and 14 are views of modifications.

1 represents the draft-beam, preferably made of two flat plates 2 and 3, secured at their front ends to the cross-clevis 4, having a series of vertical openings, and at their rear ends to the top and bottom faces, respectively, of the hollow coupling-block. This block 5 is provided near its front and rear ends with the transverse series of bolt-holes 6 for the passage of the securing-bolts 7. With this construction the draft-bar can be adjusted laterally in either direction to equalize the draft, and by making the draft-beam of two flat plates I produce an absolutely rigid connection between the cross-clevis 4 and the block 5. This block is provided near its front end with the laterally-projecting flanges 8, having shoulders 9, between which rests the adjustable gage-bar 10. This bar projects laterally over the furrow side of the plow and is adjustably held in place by the clamps 11. Secured to the outer end of the gage-bar is the bracket 12, having the vertical sleeve 13, in which is mounted the post 14 of the furrow-wheel 15. The spindle carrying the furrow-wheel is integral with but at an obtuse angle to the post, as shown, so as to hold the furrow-wheel in an inclined position. Hence it is evident that by moving the gage-bar 10 in or out, which may be done by simply loosening the clamps 11, the width or thickness of the cut of the first disk may be regulated or adjusted.

Secured to the upper end of the post 14 is the cap $15^b$, having a laterally-projecting flange 16, carrying the eyebolt 17, to which one end of the vertical spring 18 is secured, the opposite end of the spring being attached to the hook 19, formed integral with the sleeve 13. This spring tends to sustain the weight of the gage-bar and the parts connected to the latter and cushions the movements of said parts during the operation of lifting and lowering the gage-bar on the post.

Secured to the sleeve 13 is the sector 20, and pivoted to the latter is the lever 21. This lever is connected by link 22 with the sleeve 23, mounted on the post 14 between the cap 15ᵇ and fixed collar 15ᵃ, which latter may be integral with the cap, the lever 21 being provided with a spring-catch for engaging the teeth on the sector 20.

With the construction thus far described it is apparent that by depressing the free end of the lever the sleeve 13 and gage-bar 10 will be elevated, thus also elevating the block 5 and the disks carried by beams secured to the block, the upward movements of the parts being assisted by the spring 18. During the operation of lowering the gage-bar and parts sustained thereby the spring acts as a cushion and assists the operator very materially in controlling the descent.

Secured to and projecting forwardly from the spindle of the furrow-wheel is the bracket 24, to which the rear end of the brace 25 is secured. This brace is preferably made of two sections connected by a turnbuckle 26, whereby it may be readily and accurately lengthened and shortened, so as to bring and hold the furrow-wheel in proper position relative to the draft-clevis. This brace is connected at its front end to the outer end of the bell-crank lever 27, which latter constitutes the lower section of the draft-clevis. This draft-clevis is composed of two levers 27 and 28, the lower one, 27, of which is bell-crank in shape, as previously explained, while the upper one is straight and is connected to the lower one by bolts 29, one of which pivots the draft-clevis to the cross-clevis 4, the latter, as shown, being provided with a series of holes, through any one of which the pivot-pin may pass and by means of which the position of the draft-clevis may be adjusted laterally. The doubletree of the three, four, or five horse equalizer 30 is secured between the two members 27 and 28, constituting the draft-clevis, and it will be seen that when the team is turned to the right or left the draft-clevis will positively turn the post carrying the furrow-wheel.

The block 5 is provided on each side with parallel shoulders 31, between which the beams rest and which operate to take the strain from the bolts 32, which secure the beams to the block. The beams 34 are of unequal lengths, as shown, and each is provided with a bent rear end carrying the bracket-bearings 35, in which the disks 38 are journaled. Each bracket-bearing 35 is provided with an enlarged upper end provided with a slot 35ᵃ, as shown in Fig. 10, for the adjustable attachment of the bent arm 36, carrying the scraper 37. This arm is U shape, so as to overhang the top of its disk 38, and is rounded at its free end to receive the sleeve 39, carrying the scraper 37, which latter is so shaped as to clean the disk from its center to its edge. This sleeve can be turned to any position and be adjusted vertically on the rounded end of the arm 36, and as the latter can be moved in the direction of the length of the slot in the bracket-bearing the most delicate adjustments of the scraper can be secured, thus permitting the scraper to be brought up to a position to clean the disk without, if desired, making actual contact with the latter or without bearing unevenly on the disk. The sleeve 39 is normally secured to the arm 36 by means of a set-screw 39ᵃ. The bent end of the beam 34, carrying the rear disk, is made sufficiently long to receive the sleeve 40, which carries the post 41 of the caster-wheel 42. This post 41 extends up through the sleeve 40 and is provided at a point above the sleeve with the arm 42ᵃ, which is secured to the post by the through-bolt 43. This arm extends inwardly toward the landside of the plow and is provided at its free end with an eye 44, through which the eyebolt 45 passes, the latter being secured in place by a nut and washer. Secured to the eyebolt and extending forwardly in rear of the rear disk is the chain 46, which latter is secured at its front end to the rocking block 47. This block is pivoted at one end to a bracket 48, secured to the beam 34, carrying the rear disk, and is pivotally connected at its opposite end to the pitman or brace 49. This pitman or brace is made up of two parts connected by a turnbuckle and is connected at its front end to one end of the lever 50, the opposite end of said lever being pivoted at 50ᵃ to the upper plate 2 of the draft-beam. This lever, which may be of any approved construction, normally stands approximately at right angles to the draft-beam and is connected to the front end of the draft-clevis 27 28 by the arm 51. This arm is provided with an elongated slot 52, through which bolt 53, carried by lever 50, passes, and when the team is pulling straight ahead the rear wall of slot 52 in arm 51, bearing against bolt 53, prevents any rearward movement of the lever 50. Hence the latter holds the rocking block 47 in its forward depressed position and the chain 46 taut, and thus absolutely prevents the post carrying the caster-wheel 42 from swiveling to the right; but as the chain is flexible the wheel is always free to caster to the left. The tendency of the caster-wheel is, owing to the shape of its support, to caster or swivel to the right; but this tendency is overcome by the chain 46 until the team is turned to the right. When the team turns to the right, the arm 51 moves rearwardly, thus releasing the lever 50 and permitting the strain or pressure on the rocking block 47 to turn the latter upwardly and rearwardly, thus slacking the chain sufficiently for the caster-wheel to turn in the same direction. When the team turns to the left, the flexibility of the chain permits the caster-wheel to follow without any movement of the lever-brace or rocking block. This block 47 is constructed to engage shoulders 54 on the bracket 48 for preventing the block from passing below the center. When the block is in its forward position, it is nearly on the center. Consequently the block receives and sustains the pressure of the rear caster-wheel, which pressure without the interposition of this block would fall directly on lever 50 and be transmitted from thence to the draft-clevis and have a tendency to pull it to one side. With the device as constructed the lever 50 and brace 49 simply operate to lock the swinging block, while the latter receives and sustains the constant stress or pressure from the caster-wheel.

Mounted on top of the post 41 of the caster-wheel is the sleeve 55, having the horizontal bearing 56 for the cam-lever 57. This lever is connected by its cam or shorter arm to the upper end of the pitman 58, the lower end of which is pivotally connected to the sleeve 40. When the lever is extending rearwardly in a horizontal position, the sleeve 40 and the disk-beam 34, to which the sleeve is attached, are in their lowermost positions, and by turning the lever completely over until it rests in a forwardly-projecting horizontal position the sleeve 40, with its attached beam 34, will be elevated on the post, thus assisting the other wheels in lifting the disks clear of the ground. The lever 57 is provided with two shoulders 59, located on opposite sides of the pivotal point of the pitman, which engage the pitman 58 and hold the lever in the two positions just described. The sleeve 55, carrying the lever, is loose on the post, but is restrained against downward movement by the arm 42 and against upward movement by the pin 60, passing through the post.

Secured to the beam 34, carrying the rear disk, is the bearing 61, carrying the axle 62 of the ground-wheel. This axle is crank shape, as shown, and carries a lever having a spring-catch which engages the teeth of sector 63, carried by the bearing 61. By this construction the axle of the ground-wheel can be turned so as to assist in elevating and lowering the frame carrying the disks.

While I have shown and described a plow having two beams and disks, I would have it distinctly understood that my invention is not restricted to such a structure, but is equally applicable to a plow having but a single beam and disk or to a plow having more than two beams. Where but a single beam is used, as shown in Fig. 13, I prefer to brace the beam by a strap 64, secured to the side of the block 5, adjacent to the furrow-wheel and connected at its rear end to the beam, and where three beams and disks are employed, as shown in Fig. 14, the third beam is secured to a spacing-block 65, secured against the landside face of the adjacent beam, and when this spacing-block is employed it is constructed to take the place of the bearing 61, carrying the axle of the land-wheel, as shown in Figs. 1 and 13. In other respects the structure and operation of the devices are identical.

It is evident that many changes in the construction and relative arrangement of the various parts might be made without avoiding my invention, and hence I would have it understood that I do not restrict myself to the particular construction and arrangements of parts shown and described; but, Having fully described my invention, what I claim as new, and desire to secure by Letters Patent, is—

1. In a plow, the combination with a block, of disk-beams secured to respective sides of said block, a gage-bar secured to said block and extending across the same at the forward end thereof, and a draft-beam projecting under the gage-bar and secured upon said block and means for adjusting the position of said draft-beam on the block in a direction at right angles to said beam.

2. In a plow, the combination with a frame and a caster-wheel and post for the latter, of a draft-clevis and flexible device connecting the draft-clevis and caster-wheel post whereby the latter is restrained by the pull on the draft-clevis from turning in one direction independently of the draft-clevis, but is free to turn in the other direction independently of said clevis.

3. In a plow, the combination with a frame, a caster-wheel and a post for the latter, of a draft-clevis and a sectional connection between the draft-clevis and post, said connection being movable longitudinally from end to end by the clevis, and one section of said connection being rigid and the other flexible, whereby the caster-wheel post is free to turn automatically in one direction and automatically restrained from turning in the other direction.

4. In a plow, the combination with a frame, a caster-wheel and post for the latter, of a draft-clevis, and a sectional connection between the post and draft-clevis, one section of said connection being rigid and adjustable lengthwise and the other flexible.

5. In a plow, the combination with a frame, a caster-wheel and a post for the latter, of a draft-clevis, a sectional connection between the draft-clevis and caster-wheel post, and a block mounted to rock and having both sections of said connection attached to one end thereof.

6. In a plow, the combination with a frame, a caster-wheel and post for the latter, of a draft-clevis, a sectional connection between said post and clevis, one section of said connection being rigid and the other flexible, and a freely-movable rocking block connecting said sections.

7. In a plow, the combination with a frame, a caster-wheel and post for the latter, of a draft-clevis, a freely-movable rocking block pivoted to the frame, a rigid connection between the block and the clevis and a flexible connection between the block and the caster-wheel post.

8. In a plow, the combination with a frame, a caster-wheel and post for the latter, of a draft-clevis, a freely-movable rocking block mounted on the frame, an adjustable connection between the clevis and the block and a flexible connection between the block and the caster-wheel post.

9. In a plow, the combination with a frame, a caster-wheel and post for the latter, of a freely-movable rocking block pivoted to the frame, means for preventing said block from dropping below the center, a draft-clevis, a rigid connection between the clevis and rocking block and a flexible connection between the block and the caster-wheel post.

10. In a plow, the combination with a beam, a frame, a draft-clevis pivoted to the beam, a lever also pivoted to the beam and a connection between the draft-clevis and lever for preventing movement of the latter when the draft is in line with the beam, of a caster-wheel, a rocking block pivoted to the frame, an unyielding connection between the lever and the block, and a flexible connection between the rocking block and the caster-wheel post.

11. In a plow, the combination with a frame, a caster-wheel and post therefor, the post being mounted in a bearing on said frame, of a cam-lever fixed to the post and provided with two stops and a link pivoted to said lever and to the frame, the stops on the lever adapted to engage the link and hold the lever in its two adjustments.

12. In a plow, the combination with a frame and a caster-wheel post mounted therein, of a bearing carried by said post, a cam-lever mounted in said bearing, a link pivoted to said lever and to the frame and stops on the lever on opposite sides of the pivotal attachment of the link.

13. In a plow, the combination with a block having series of vertical holes therein and a plow-beam rigidly secured at its forward end to said block and projecting rearwardly therefrom, of a draft-beam adjustable laterally on said block in a direction at right angles to said beam, a draft-clevis and a cross-clevis secured to the front end of the draft-beam and provided with a series of holes for the adjustable attachment of the draft-clevis.

In testimony whereof I have signed this specification in the presence of two subscribing witnesses.

CALVIN R. DAVIS.

Witnesses:
    FRANCIS C. NIPPOLD,
    EDWIN NICAR.